United States Patent [19]

Buzzi

[11] 4,103,532

[45] Aug. 1, 1978

[54] DEVICE FOR MEASURING THE DAMPING EFFECT OF MOTOR VEHICLE SUSPENSIONS

[76] Inventor: Carlo Buzzi, Via Risorgimento 60, Mandello Del Lario (Como), Italy

[21] Appl. No.: 795,831

[22] Filed: May 11, 1977

[30] Foreign Application Priority Data

Jun. 10, 1976 [IT] Italy .................................. 7213 A/76

[51] Int. Cl.² .......................................... G01M 17/04
[52] U.S. Cl. ....................................................... 73/11
[58] Field of Search .................................. 73/11, 67.1

[56] References Cited

U.S. PATENT DOCUMENTS

| 3,416,363 | 12/1968 | Siems | 73/67.1 |
| 3,836,757 | 9/1974 | Nachtigal et al. | 73/67.1 X |
| 3,902,352 | 9/1975 | Buzzi | 73/11 |
| 3,981,174 | 9/1976 | Himmler | 73/11 |

Primary Examiner—Charles A. Ruehl
Attorney, Agent, or Firm—Karl W. Flocks

[57] ABSTRACT

This invention relates to a device for measuring the damping effect of motor vehicle suspensions. The device according to the invention comprises operating means for imparting a periodic vertical oscillating movement to a motor vehicle suspension, first and second sensor means for transducting into corresponding electrical signals the instantaneous force transmitted to the suspension and the instantaneous displacements of the point of application of said oscillating movement to the suspension, first processing means for calculating and integrating over one cycle the scalar product of said signals and second processing means for dividing said integrated scalar product by a quantity proportional to the product of the oscillation frequency and the square of the oscillation amplitude.

11 Claims, 4 Drawing Figures

U.S. Patent    Aug. 1, 1978    4,103,532
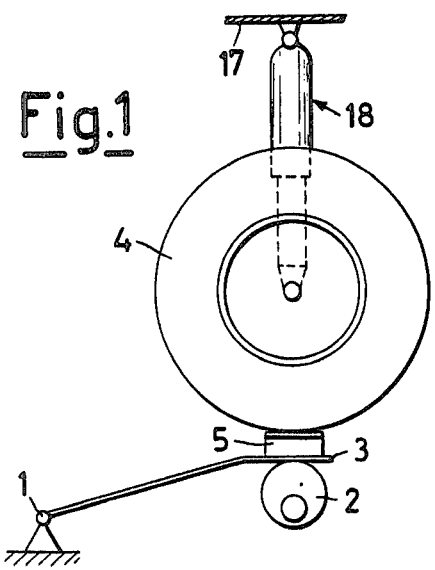
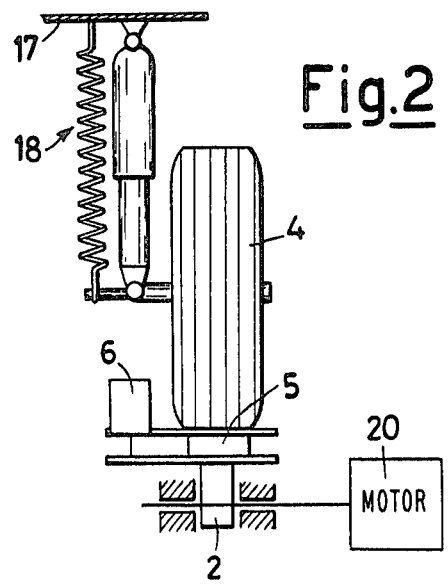
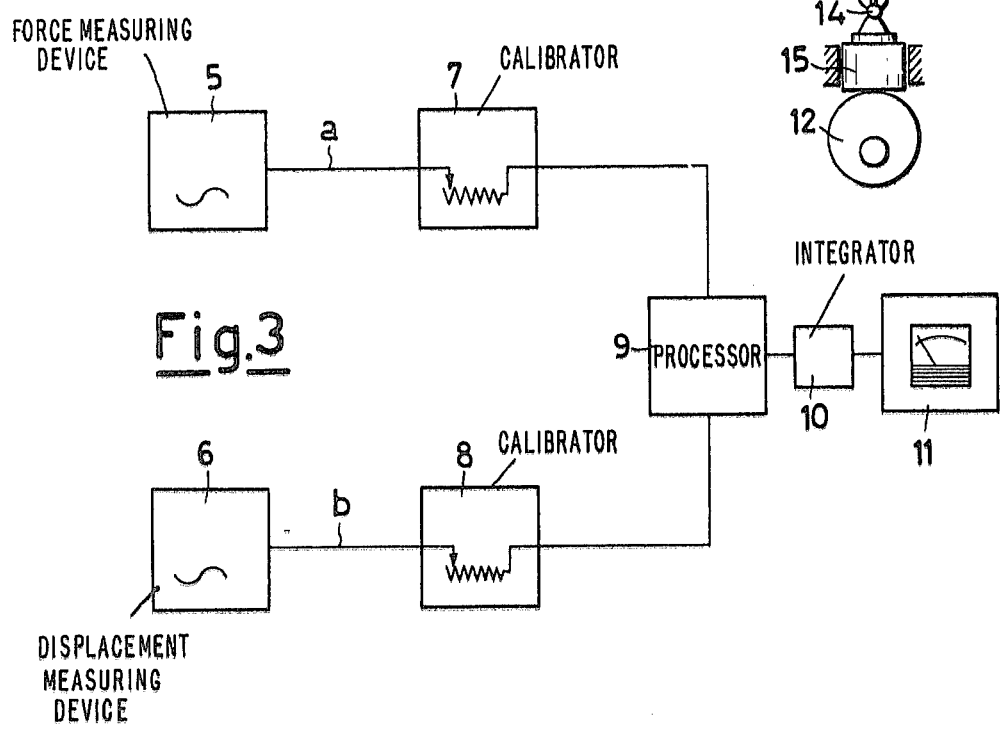

DEVICE FOR MEASURING THE DAMPING EFFECT OF MOTOR VEHICLE SUSPENSIONS

Shock absorbers are provided in vehicles comprising elastic suspensions for the purpose of absorbing the energy of the vibrations induced in the vehicle by external agents.

If there were no damping effect generated by the shock absorbers, the vehicle wheels would swing freely to subject the vehicle body to oscillatory motion which would make driving unsafe and impair the comfort of the passengers.

In order to measure the damping effect and hence check the efficiency of the shock absorbers mounted on vehicles, known apparatus has been devised to measure the vibration amplitude or the force reacting to the vibration in the suspension after the suspension has been set in oscillatory motion by various means.

In all such apparatus, quantities are measured which depend not only on the damping effect but also on the other characteristics of the elastic system, namely the masses in play, the elasticity of the suspension and tyres, the vibration frequency, and the position of the vehicle relative to reference points.

The results obtained must be suitably interpreted by experience, because of which they must often be considered subjective and uncertain.

The object of the present invention is to provide a device in which the equivalent damping coefficient relative to the shock absorbers and friction of the other moving members of motor vehicle suspensions is measured such as to obviate the aforesaid drawbacks.

The device according to the invention originates from the known principle that in an oscillating system, such as a motor vehicle on its suspensions, many types of damping forces may be present. The differential equation which takes such forces into account can generally not be solved, so that generally it is not possible to directly measure the various damping forces. The solution is harmonic and can be dealt with in an elementary manner only under viscous damping conditions. For all other types of damping, reference may be made to an equivalent viscous damping evaluated by assuming harmonic motion with an equal energy dissipation. In this respect, two damping systems which dissipate the same energy are considered equivalent. If one of these systems has only viscous type damping, and thus a viscous damping coefficient r may be defined for it, it is assumed that the same coefficient is able to define the behaviour of the system in which damping is of mixed type, i.e. for example due to friction, hysteresis and the like. The aforesaid coefficient is known as the "equivalent viscous damping coefficient".

This supposition is commonly accepted in studying damped oscillating systems of any type, as by suitable approximation it is able to completely define the damping characteristics of the system.

The energy dissipated per cycle by the viscous damper subjected to a force oscillating at a frequency $f$ is notably:

$$E = \int \vec{F}\, \vec{ds} = 2r_v \pi^2 x^2 f$$

where $E$ = energy, $F$ = force, $x$ = oscillation amplitude, $f$ = oscillation frequency, $ds$ = displacement, $r_v$ = viscous damping coefficient.

From this equation and the said supposition, the equivalent viscous damping is determined by the equation:

$$r_{eq} = r_v = \frac{E}{2\pi^2 x^2 f}$$

If it is assumed that the amplitude and oscillation frequency are constant, the equivalent viscous damping coefficient is then proportional to the energy dissipated by the vibrating system which, in its turn, may be taken as a scalar product of force and displacement from the definition of mechanical work.

The device according to the invention has been devised by applying these known considerations to measuring the damping effect of motor vehicle suspensions, and comprises operating means for imparting a periodic vertical oscillating movement to a motor vehicle suspension, first sensor means for transducing the instantaneous force transmitted to the suspension into an electrical signal, second sensor means for transducing the instantaneous displacements of the suspension into an electrical signal, first processing means for forming the scalar product of the signals emitted by the first and second sensor means to produce a first signal which when integrated is indicative of the amount of energy dissipated in one cycle, and second processing means for dividing said first signal by a quantity proportional to the product of the oscillation frequency and the square of the oscillation amplitude to produce a second signal indicative of the value of the equivalent viscous damping coefficient of the suspension.

Thus by measuring the energy dissipated in one cycle and taking suitable account of the oscillation amplitude and frequency, the device according to the invention produces a signal indicative of the equivalent viscous damping coefficient, which represents a damping coefficient capable of completely describing the damping capacity of the suspension and all members connected thereto.

It should be noted that where the frequency of the imparted oscillation is constant, it is equivalent to measure a speed or a displacement at the point on which the wheel rests.

Two non-limiting embodiments of the invention are shown in the accompanying drawings, in which:

FIG. 1 and 2 are diagrammatic front and side views of a device according to the invention for measuring the damping effect of a motor vehicle suspension via the wheel to which it is fitted;

FIG. 3 is a block diagram of the processing assembly for the signals, forming part of said measuring device;

FIG. 4 is a diagrammatic view of a device according to the invention fitted to a shock absorbing element separate from the vehicle.

The vibrating device may be of any type, providing it is able to induce fixed or variable speed movement of fixed or variable amplitude in one or more vehicle suspensions simultaneously.

In FIG. 1 a wheel 4 connected to the chassis 17 of a motor vehicle via a suspension indicated overall by 18 rests on a board 3 pivoted at 1, on which a sinusoidal movement is impressed by a cam 2 driven by a variable speed motor 20 indicated in FIG. 2.

The force transmitted by the vibrating device to the suspension 18 associated with the wheel 4 may be measured by any force measuring device 5 (FIG. 2 and FIG. 4), which is mounted in such a manner as to support the entire force deriving from the suspension movement. This measuring device may be of any type, for example piezoelectric, magnetostriction or strain gauge.

The measurement of the displacement (or of the speed or acceleration, given that it is very simple to pass by electric means from one to the other of these quantities) takes place at the same point in which the force is measured, for example by a measuring device 6.

The transducers used may be simple electrodynamic measuring devices able to provide an electrical signal proportional to the speed of the point, or any other known transducer.

FIG. 3 is a diagram of the measuring system.

After calibration in circuit blocks 7 and 8 to put the electrical signals (a, b) proportional to force and displacement into the required units, the signals are combined in a processor 9 which is able to give as its output a signal proportional to the scalar product $\vec{a} \times \vec{b}$ or $\vec{F} \times \vec{s}$, where F is the instantaneous force transmitted to the wheel and s the displacement of said wheel. This processor may be constituted by an analogue multiplier, a digital system or a watt meter.

The product thus obtained may be used directly in a recorder to evaluate the variations in dissipated energy during one cycle, and may be integrated in an integrator 10.

The output signal from the integrator 10 is a signal proportional to the energy dissipated in one cycle by the suspension, and thus if the oscillation amplitude and frequency are constant, it is proportional to the equivalent viscous damping coefficient.

The proportionality constant $1/\pi^2 x^2 f$ may already have been considered in calibrating the scale of an instrument 11, where the vibration frequency and amplitude are constant. In other cases, it is necessary to obtain either each time or automatically the value of $1/\pi^2 x^2 f$ to be multiplied by the energy to give the equivalent viscous damping coefficient.

The data thus processed may be presented on an instrument 11 of any known type.

FIG. 4 is a diagrammatic illustration of a version of the device according to the invention able to measure the damping effect of a shock absorber separate from the vehicle. An eccentric 12 imposes reciprocating motion on a shock absorber 13 under test, by a motor not shown in the figure. The lower end 14 of the shock absorber is fixed to a force measuring device 15 while the upper end is fixed to a fixed support 19. A further measuring device 16 transduces the displacement between the two ends of the shock absorber 13 into an electrical signal. The two signals are then processed in the manner illustrated in FIG. 3.

What we claim is:

1. A device for measuring the damping effect of motor vehicle suspensions, comprising operating means for imparting a periodic vertical oscillating movement to a motor vehicle suspension, first sensor means for transducing the instantaneous force transmitted to the suspension into an electrical signal, second sensor means for transducing the instantaneous displacements of the point of application of said oscillating movement to the suspension into an electrical signal, first processing means for integrating over one cycle the scalar product of the signals emitted by the first and second sensor means to produce a first signal which is indicative of the amount of energy dissipated in one cycle, and second processing means for dividing said first signal by a quantity proportional to the product of the oscillation frequency and the square of the oscillation amplitude to produce a second signal indicative of the value of the equivalent viscous damping coefficient of the suspension.

2. A device as claimed in claim 1, wherein said operating means are arranged to produce an oscillation of constant amplitude and frequency.

3. A device as claimed in claim 1, wherein said operating means are constituted by at least one rotating eccentric mounted on a shaft driven by a motor, on said eccentric there resting a support board for a motor vehicle wheel associated with the suspension under measurement.

4. A device as claimed in claim 3, wherein said motor is of the variable speed type.

5. A device as claimed in claim 1, wherein said operating means are constituted by at least one rotating eccentric mounted on a shaft driven by a motor, said eccentric being arranged to act on suspension parts separated from the motor vehicle.

6. A device as claimed in claim 4, wherein said motor is of the variable speed type.

7. A device as claimed in claim 1, wherein said first sensor means are constituted by a piezoelectric measuring device.

8. A device as claimed in claim 1, wherein said first sensor means are constituted by a magnetostriction measuring device.

9. A device as claimed in claim 1, wherein first sensor means are constituted by an electrodynamic measuring device.

10. A device as claimed in claim 1, wherein said second sensor means are constituted by a differential transformer.

11. A device as claimed in claim 1, wherein said second sensor means are constituted by an electrodynamic measuring device arranged to produce an output signal proportional to the speed, said measuring device being followed by an integrator for converting said signal into a signal the value of which is proportional to the displacement.

* * * * *